Sept. 6, 1960  M. C. MAIN  2,951,546
LEVELLING ATTACHMENT FOR CULTIVATORS
Filed Nov. 5, 1956  2 Sheets-Sheet 1
Fig. 1
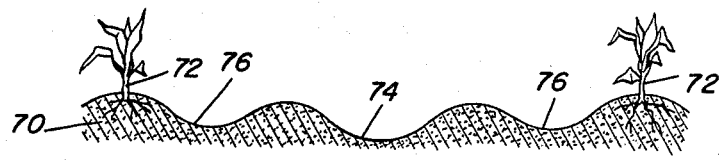
Fig. 2
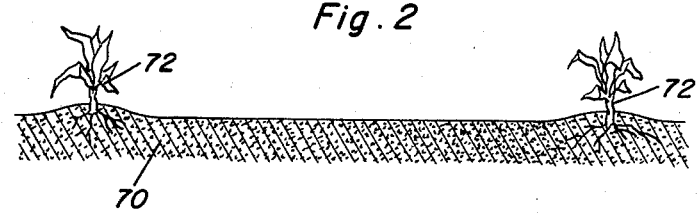
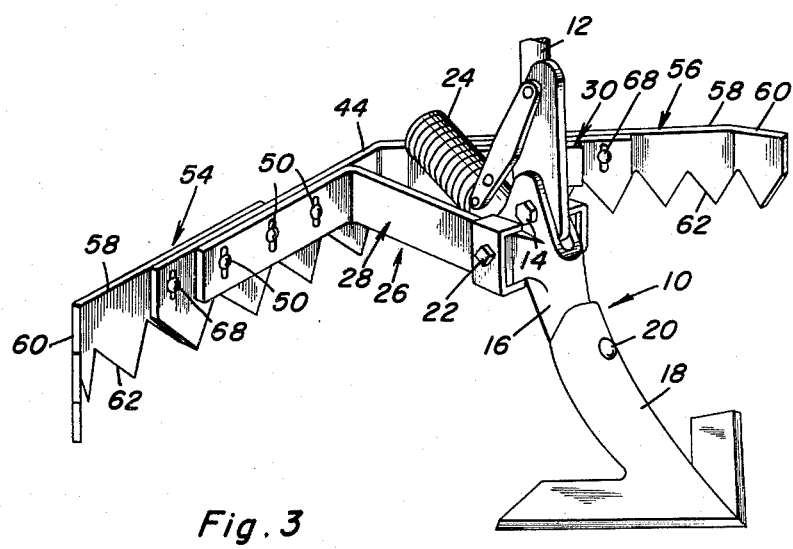
Fig. 3
Max C. Main
INVENTOR.
BY Max C. Main
INVENTOR.

United States Patent Office 2,951,546
Patented Sept. 6, 1960

2,951,546

LEVELLING ATTACHMENT FOR CULTIVATORS

Max C. Main, R.D. 1, Delaware, Ohio

Filed Nov. 5, 1956, Ser. No. 620,346

1 Claim. (Cl. 172—194)

This invention relates in general to new and useful improvements in farm equipment, and more specifically to an improved levelling attachment for cultivators.

During a normal cultivating operation, the center cultivator shovel makes a relatively deep impression between rows and the row shovels make relatively shallow depressions immediately adjacent the rows. Such depressions are undesirable for a number of reasons. For example, the depressions make it harder to guide the tractor during subsequent cultivating and harvesting operations as well as creating a rough surface condition and causes rough riding for the operator of the tractor as well as unnecessary vibration of equipment used in cultivating and harvesting operations. Also, the depressions not only tend to drain the rainfall away from the plant roots, but also such depressions can lead to washing on downgrade surfaces and do create a greater area of surface contour exposed for greater and faster evaporation of moisture from the soil area between crop rows. Further, the depressions create a varying contour making it difficult to properly regulate combines or pickers used in harvesting operations and create a harder condition for preparing the ground for successive crop planning operations.

It is therefore the primary object of this invention to provide an improved levelling device which may be mounted on the center shovel of a gang cultivator and which is so constructed whereby it will effectively level the soil between adjacent rows of a crop.

Another object of this invention is to provide an improved levelling device for use in conjunction with cultivators, the levelling device being so constructetd whereby it filters only the finest soil around the plant roots and stalks and the coarser materials are either broken up or spread evenly in the center of the area between adjacent rows.

Still another object of this invention is to provide an improved levelling device for cultivators, the levelling device being of an extremely simple construction and being readily adjustable so as to be adaptable for various row spacings and types of crop cultivation.

A further object of this invention is to provide an improved levelling device for cultivators, a levelling device including mounting brackets which are of such a nature whereby they may be rigidly attached to a shovel carrier for support thereby, there being secured to the mounting brackets a ground engaging levelling member which has a lower saw tooth contour to facilitate the proper distribution of the earth, the levelling attachment also including extensions which have outer wing portions to assure the proper movement of the earth towards the depressions formed by the shovels during the cultivating operation whereby the high spots between the rows are removed and the material therefrom deposited into the depressions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary sectional view taken through a field between adjacent rows of a crop after a normal cultivating operation;

Figure 2 is a fragmentary sectional view similar to Figure 1 and shows the same field after a cultivating operation utilizing the levelling attachment which is the subject of this invention;

Figure 3 is an enlarged fragmentary perspective view of the lower portion of a shovel-type cultivator, the cultivator carrying the levelling device which is the subject of this invention;

Figure 4:
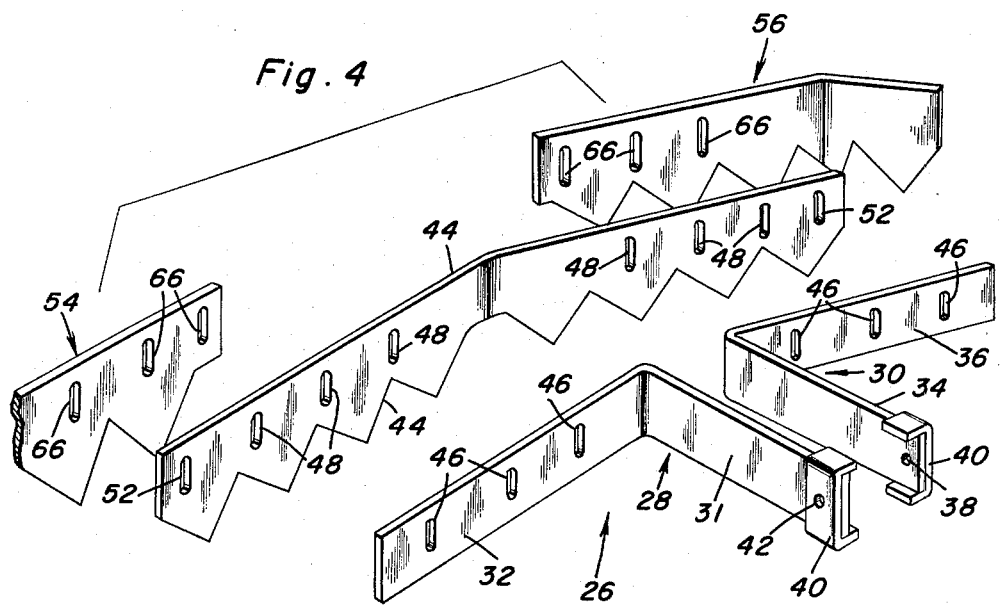
Figure 4 is an enlarged exploded perspective view of the levelling device.
Figure 5:
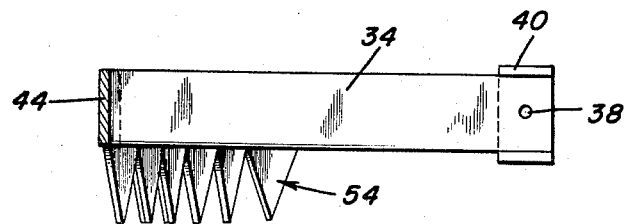
Figure 5 is an enlarged longitudinal sectional view taken through the levelling device and shows further the details of construction thereof.

Referring now to Figure 3 in particular, it will be seen that there is illustrated a conventional shovel-type cultivator which is referred to in general by the reference numeral 10. The cultivator 10 includes a shank 12 which has pivotally mounted on the lower end thereof by means of a pivot bolt 14 a shovel carrier 16. The shovel carrier 16 supports a shovel 18 which is secured thereto by means of a bolt 20. The cultivator 10 is provided with the usual overload spring 24 which is secured to suitable levers and links, the links being connected to the shovel carrier 16 by means of a bolt 14.

Mounted on the shovel carrier 16 and extending rearwardly therefrom is the levelling attachment which is the subject of this invention, the levelling attachment being referred to in general by the reference numeral 26. As is best illustrated in Figure 4, the levelling attachment 26 includes a pair of mounting brackets 28 and 30. The mounting bracket 28 includes a forwardly extending member 31 and an outwardly extending rear arm 32. The arm 32 is disposed at an angle less than 90 degrees to the member 30 and slopes slightly forwardly and outwardly therefrom.

The mounting bracket 30 is similar to the mounting bracket 28, but differs therefrom in that it is a left hand version whereas the mounting bracket 28 is a right hand version. The mounting bracket 30 includes a forwardly extending member 34 and an outwardly extending rear arm 36.

The forward ends of the members 31 and 34 are provided with aligned bores 38. Engaged over the forward ends of the members 31 and 34 are channel-shaped attaching brackets 40. The attaching brackets 40 have bores 42 which are aligned with the bores 38. At this time, it is pointed out that the attaching brackets 40 may vary slightly in configuration depending upon the particular cultivator on which the levelling attachment 26 is to be mounted.

The levelling attachment 26 also includes a ground levelling member 44 which is generally V-shaped in plan and which opens forwardly. The ground levelling member 44 is of a greater height than the mounting brackets 28 and 30 and has a lower saw tooth configuration 44 which extends below the arms 32 and 36. The arms 32 and 36 are provided with slots 46 which are aligned with slots 48 in the outer portions of the ground levelling member 44. Passed through the aligned slots 46 and 48 and securing the ground levelling member 44 to the mounting brackets 28 and 30 is a plurality of fasteners 50.

It is to be noted that the ends of the ground levelling member 44 project outwardly of the ends of the arms 32 and 36 and that the end portions of the ground levelling member 44 are provided with slots 52.

The ground levelling attachment 26 also includes extensions 54 and 56, the extensions 54 and 56 being identical with the exception that the extension 54 is a right hand extension and the extension 56 is a left hand extension. Each of the extensions 54 and 56 includes a main body portion 58 and an outer wing portion 60, the wing portions 60 extending forwardly at a greater angle than the main portion 58. The extensions 54 and 56 have lower saw tooth configurations 62 and are of the same height and design as the ground levelling member 44. It is to be noted that the extensions 54 and 56 are disposed in overlapping relation with respect to the outer ends of the ground levelling member 44 and are secured thereto by certain of the bolts 50. The bolts 50 also pass through slots 66 formed in the extensions 54 and 56. Also, additional fasteners 68 pass through the slots 52 of the ground levelling member 44 and aligned ones of the bores 66.

By providing both the ground levelling members 44 and the extensions 54 and 56 with a plurality of slots of equal spacing, it will be readily apparent that the extensions 54 and 56 may be adjusted both vertically and transversely relative to the ground levelling member 44 so as to make the effective combined widths of the ground levelling member 44 and the extensions 54 and 56 that desired for any particular row spacing. It is to be noted that the slots in the ground leveling member 44 and in the extensions 54 and 56 are so spaced whereby the teeth of the ground levelling member 44 and extensions 54 and 56 remain in alignment irrespective of the relative positions of the extensions 54 and 56 with respect to the ground levelling member 44.

The atttaching brackets 40 are so configurated whereby when the mounting brackets 28 and 30 are attached to the shovel carrier 16, relative movement between the two is prevented. The mounting brackets 28 and 30 are secured in place by the bolt 22, the bolt 22 being a replacement bolt of a greater length than the normal bolt utilized in the construction of the cultivator 10, but serving the same function in addition to the rigid mounting of the levelling attachment 26.

Referring now to Figure 1 in particular, it will be seen that there is illustrated a portion of a field 70 having rows 72 of a crop planted therein. After a normal cultivating operation, there is left a relatively deep central depression 74 and shallower outer depressions 76. The central depression 74 is formed by the central cultivator shovel and the outer depressions 76 are formed by the row cultivator shovels. This condition is undesirable and rectified by utilizing the ground levelling attachment 26.

Referring to Figure 2 in particular, it will be seen that there is illustrated the same field 70 with the rows 72 planted therein. However, the ground between the rows 72 is relatively level and slightly below the ground immediately in the vicinity of the rows 72 as is desired. This is accomplished by the action of the levelling attachment 26. During the cultivating operation, the extensions 54 and 56 sift the fine earth towards the rows 72 and urge the larger clods and stones towards the center.

The ground leveling member 44 then picks this up and urges the excess ground, etc. towards the center filling the depressions 74 and 76.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A levelling attachment for cultivators of the type having a depending shank with a shovel carrier pivoted thereon and an overload release spring operatively connected to said carrier and extending rearwardly therefrom; said attachment comprising a pair of mounting brackets, said mounting brackets having forward ends, means on said forward ends for rigidly mounting said mounting brackets on the opposite sides of a shovel carrier, said mounting brackets including spaced longitudinally extending forward arms providing a space therebetween for receiving said overload release spring, and outwardly directed rear arms, a ground levelling member extending across said rear arms and rigidly secured thereto, said ground levelling member being generally V-shaped in plan and opening forwardly, said ground levelling member having a lower saw tooth configuration, said mounting means including generally channel-shaped attaching brackets fixedly mountable on the opposite sides of a shovel carrier, said forward arms being each secured in one of said attaching brackets, adjustable extensions on opposite ends of said ground levelling member, said extensions having forwardly extending outer wing portions, said ground levelling member and said extensions having equally spaced, parallel, vertically extending slots near the upper ends thereof, said rear arms having corresponding slots therein, means for selectively aligning and securing said ground levelling members and said extensions to said rear arms whereby the width of said levelling attachment may be varied and the height of the various levelling elements may be adjusted vertically.

References Cited in the file of this patent

UNITED STATES PATENTS

| | | |
|---|---|---|
| 480,529 | Tindall | Aug. 9, 1892 |
| 486,861 | Dodge | Nov. 29, 1892 |
| 536,130 | Cleveland | Mar. 19, 1895 |
| 653,320 | Sewall | July 10, 1900 |
| 800,650 | James | Oct. 3, 1905 |
| 979,817 | Allbee | Dec. 27, 1910 |
| 1,128,506 | Polo | Feb. 16, 1915 |
| 1,215,044 | Monroe | Feb. 6, 1917 |
| 1,241,033 | Schrum | Sept. 25, 1917 |
| 1,543,115 | Long | June 23, 1925 |
| 1,668,850 | Larsh | May 8, 1928 |
| 2,715,865 | Dennewitz | Aug. 23, 1955 |
| 2,758,531 | Siems | Aug. 14, 1956 |